United States Patent [19]
Rebane et al.

[11] 3,857,022
[45] Dec. 24, 1974

[54] GRAPHIC INPUT DEVICE

[75] Inventors: George J. Rebane, Semi Valley; Norman R. Grossman, Los Angeles, both of Calif.

[73] Assignee: Integrated Sciences Corporation, Santa Monica, Calif.

[22] Filed: Nov. 15, 1973

[21] Appl. No.: 416,172

[52] U.S. Cl. .................. 235/151, 178/18, 340/16 R
[51] Int. Cl. .......................... G06f 15/32, G01s 3/80
[58] Field of Search ........... 235/151, 151.3, 151.32; 178/18–20; 340/16 R

[56] References Cited

UNITED STATES PATENTS

| | | | |
|---|---|---|---|
| 3,134,099 | 5/1964 | Woo | 178/18 X |
| 3,156,766 | 11/1964 | Stamps | 178/18 |
| 3,439,317 | 4/1969 | Miller et al. | 178/18 X |
| 3,504,334 | 3/1970 | Turnage | 178/18 X |
| 3,684,828 | 8/1972 | Maher | 178/18 |
| 3,692,936 | 9/1972 | Moffitt | 178/18 |
| 3,731,273 | 5/1973 | Hunt | 178/18 X |

*Primary Examiner*—Malcolm A. Morrison
*Assistant Examiner*—Jerry Smith
*Attorney, Agent, or Firm*—Lindenberg, Freilich, Wasserman, Rosen & Fernandez

[57] ABSTRACT

An interface device is provided comprising a screen made of a material such as plastic or glass whereby the two dimensional coordinates of the location at which the screen is tapped, by an object, such as a stylus, is obtained in the form of representative electrical signals, which may be supplied to a data processing machine.

7 Claims, 5 Drawing Figures

GRAPHIC INPUT DEVICE

BACKGROUND OF THE INVENTION

This invention relates to a system for generating signals representative of the coordinates of a point on a screen which has been tapped by a stylus. An apparatus of a type comprising a screen upon which an image or a pattern is projected, and which, when tapped at a particular point, generates electrical signals representative of the coordinates of the point tapped can have substantial utility. For example, as a learning device, one could project these images or patterns and the student, by a tap on the screen at one or the other of designated locations, can indicate the right or wrong answer, or, by the location at which he taps, can identify a particular object which is spelled out. The electrical signals which are generated as a result, can be entered into a data processing system which can indicate the correctness of the tapping location.

Maps can be projected on the screen and the coordinates of a desired location on the map can be instantly obtained by the simple expedient of tapping at that location.

The coordinates of the point at which a screen is struck by a golf ball or a baseball, or even a football, can be used to indicate the accuracy of the individual responsible for the trajectory taken by the ball.

Another utility for a device of the type mentioned can be its use in target practice to indicate the coordinates of an impacting projectile.

From the foregoing, it may be seen that if a device of the type described were available, it would have widespread utility.

OBJECTS AND SUMMARY OF THE INVENTION

An object of this invention is to provide a system for obtaining, acoustically, the coordinates of a location tapped on a screen.

Yet, another object of this invention is to provide a novel and unique device for acoustically generating electrical signals representative of the coordinates of a locus on a screen which locus has been tapped.

These and other objects of the invention may be achieved in an arrangement wherein a sheet of glass or plastic material, in the form of a rectangle, has a suitable electroacoustic transducer attached to the edges thereof. These transducers may be a plurality of small microphones which generate an electrical signal in response to sound being received through the glass or plastic material. A tap on the screen causes sound waves to be propagated through the material to the three edges.

Circuitry is provided which functions in response to the difference in arrival time of the acoustically propagated signals to compute the X and Y coordinates of the locus of the point which was tapped, with reference to a point at the intersection of two of the edges which may be called the origin point.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
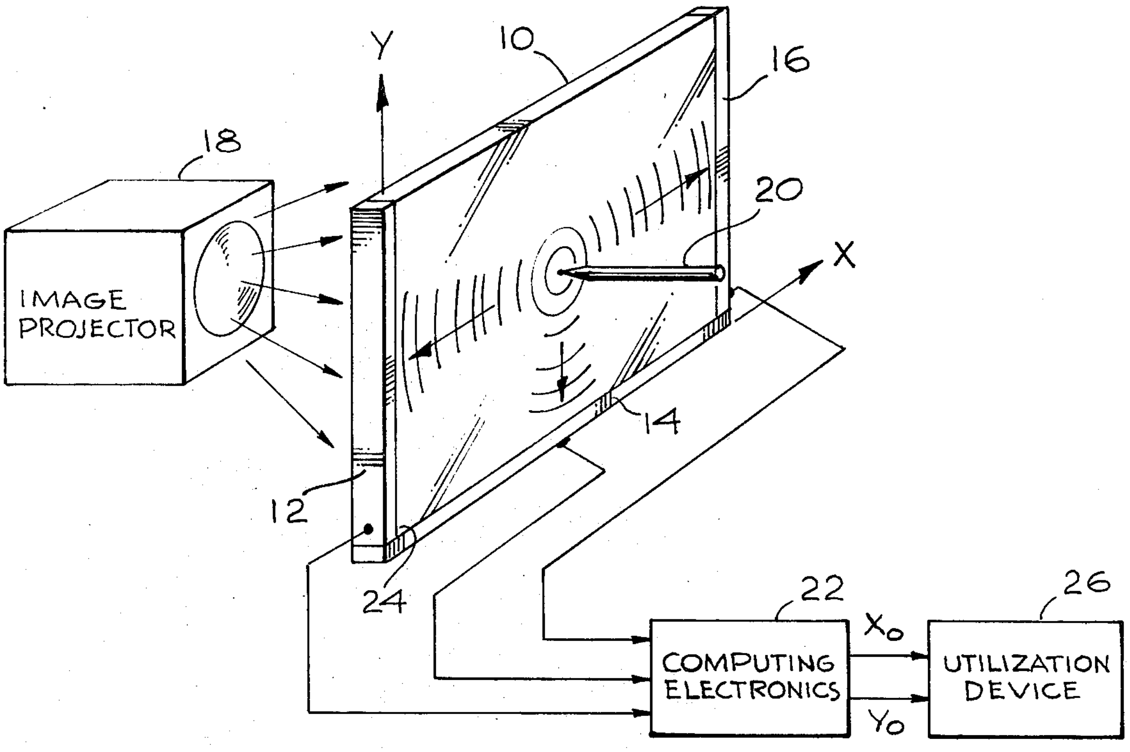
FIG. 1 is a schematic view of the appearance of an embodiment of the invention.

Referring now to FIG. 1, there may be seen a schematic drawing of an embodiment of the invention. A screen 10, which is made of a suitable material, such as glass or plastic, has electroacoustic transducers 12, 14, 16 attached to three adjacent sides. The transducers may be a plurality of small microphones which are attached to the three sides of the screen, in side by side relationship, so that they will respond substantially only to the sound coming to them through the screen and not through the surrounding environment. This may be done by acoustically insulating the microphone except for sound received through the screen.

The screen may be translucent so that an image may be projected thereon from an image projector 18 which is positioned behind the screen. The image projector may, of course, be a cathode ray tube system, a motion picture projector, or a still projector. On the other hand, the screen may be opaque, if the image is to be projected from the same side as the one on which the user of the system is positioned.

In its simplest form, the user of the system grasps a stylus 20, and taps a point on the screen. As a result of the tap, sound waves radiate from the tapped point in the manner represented by the lines and arrows shown on the screen, until they reach the electroacoustic transducers 12, 14 and 16 attached to the three edges of the screen. These transducers convert the acoustic signal into an electrical signal which is applied to computing electronics 22. The computing electronics provides an output comprising the X and Y coordinates respectively designated as $X_0$ and $Y_0$ of the point which was tapped, in either analog or digital form as desired. These coordinates are with reference to whichever one of the two bottom corners has been selected as the origin point, (0, 0). Here, one of the bottom corners which may be selected is designated by the reference numeral 24.

The output of the computing electronics 22 may be applied to a suitable utilization device 26. This may be a display device which may indicate visually the location of the tapping point. For example, if the screen was used for target practice, the display may indicate the location of the point tapped with reference to a center point. On the other hand, the utilization device may be a computer which controls cathode ray display apparatus whereby an indication may be given to the user, if the machine is a learning machine, as to whether or not his tapped point was a correct selection. If the computer is for the purpose of providing artillery range information, the utilization device may include display means for indicating artillery ranges.

Figure 2:
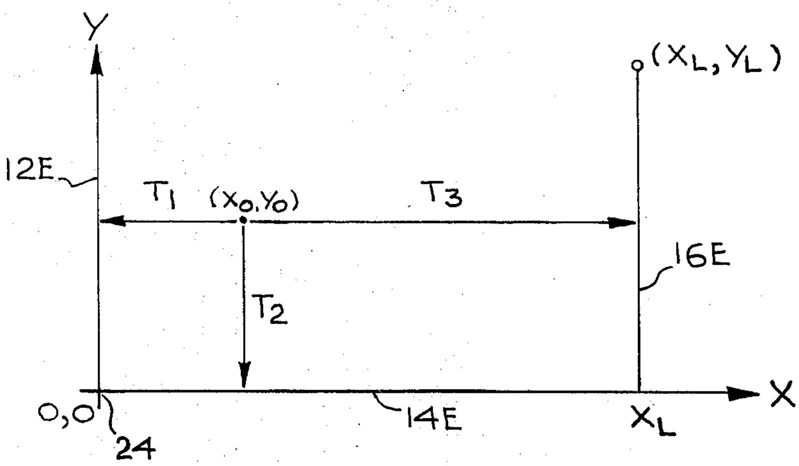
FIG. 2 is a drawing of coordinate geometry shown to assist in an understanding of this invention.

Referring now to FIG. 2, there is shown a representation of the coordinate geometry which is involved in this invention. The three edges which have the transducers 12, 14 and 16 in FIG. 1 are represented by lines 12E, 14E, 16E. The locus of a tapped point has the coordinates $X_0$, $Y_0$. The distance along the X axis from the 0,0 point 24 to the end of the screen is designated as $X_L$. The length of the screen in the direction of the Y axis is designated as $Y_L$.

Let the propagation time from $X_0$, $Y_0$ to the side 12E be $T_1$. The propagation time from $X_0$, $Y_0$ to side 14E is $T_2$. Propagation time from $X_0$, $Y_0$ to side 16E is $T_3$. If the acoustic propagation velocity of the screen is V, then the travel times of the incident waves perpendicular to the transducers on the three sides are given by $$T_1 = X_0/V,\ T_2 = Y_0/V,\ T_3 = (X_L - X_0)/V \qquad (1)$$

The differences in arrival times are given by $$\Delta T_{12} \equiv T_1 - T_2 = 1/V\ (X_0 - Y_0) \qquad (2)$$

$$\Delta T_{23} \equiv T_2 - T_3 = 1/V\ (X_0 + Y_0 - X_L) \qquad (3)$$

Since the time differences may be measured, equation (2) can be solved for the desired coordinates.

$$Y_0 = V/2\ (\Delta T_{23} - \Delta T_{12}) + X_L/2 \qquad (4)$$

$$X_0 = V/2\ (\Delta T_{23} + \Delta T_{12}) + X_L/2 \qquad (5)$$

Figure 3:
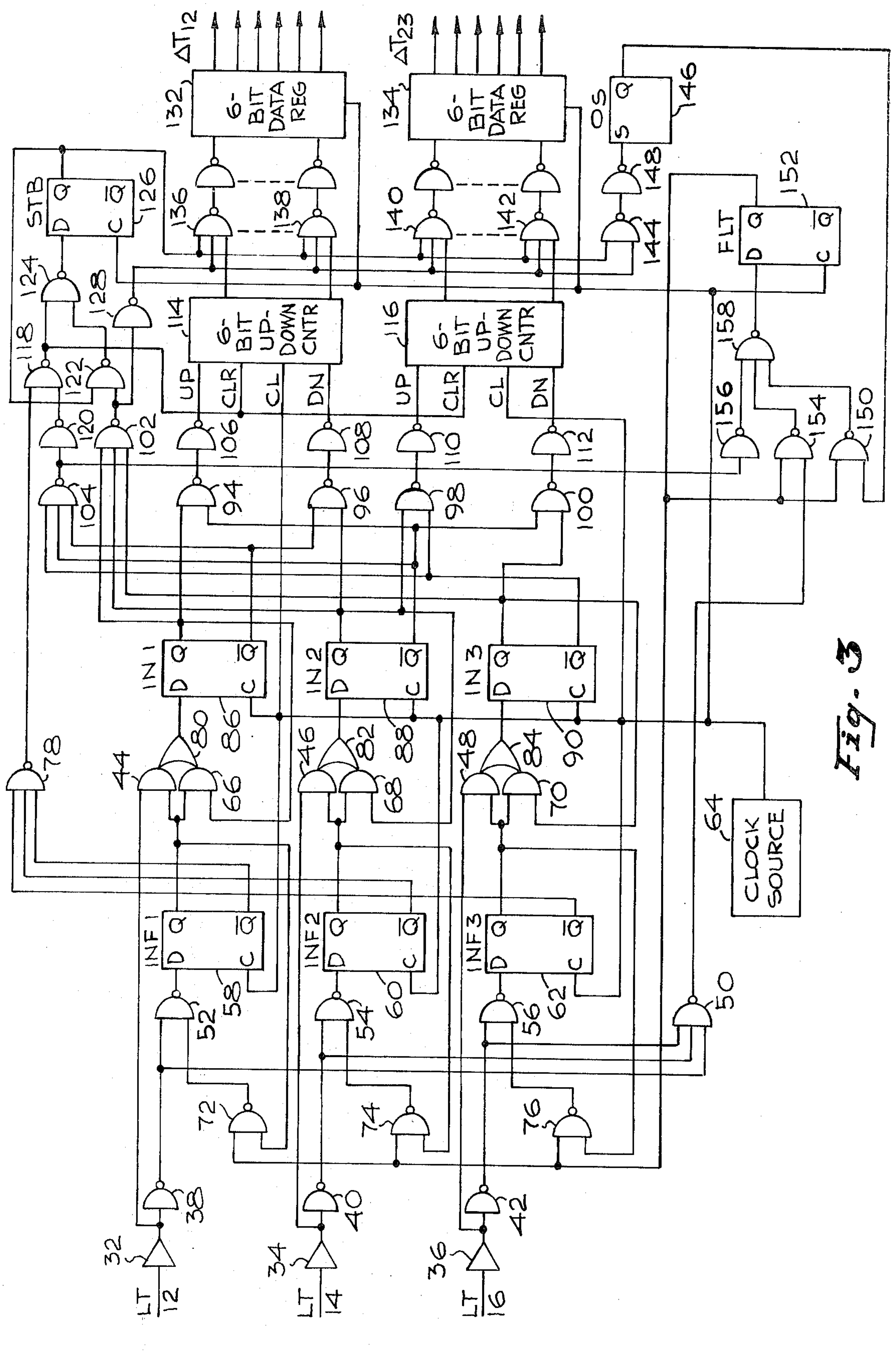
FIGS. 3 and 4 comprise a block schematic diagram of the circuitry employed in this invention.
Figure 5:
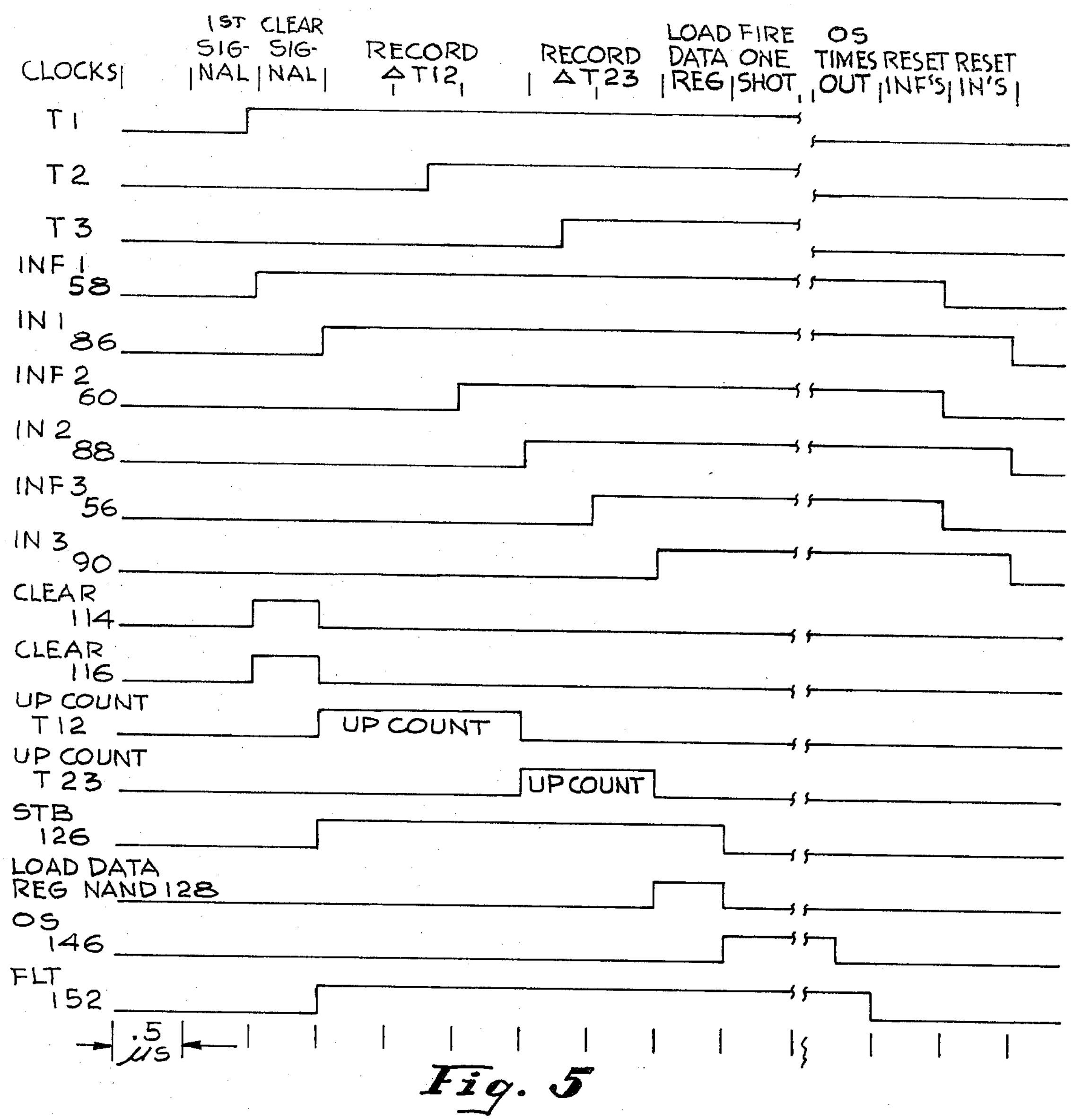
FIG. 5 is a timing diagram which will assist in an understanding of the invention.

Reference is now made to FIGS. 3 and 5 which comprises a block schematic block diagram of circuitry used in an embodiment of the invention. The outputs from the three line transducers, respectively 12, 14 and 16, are amplified by amplifiers, respectively 32, 34, 36. The outputs of the amplifiers are respectively applied to inverters 38, 40, 42, as well as to AND gates 44, 46 and 48.

The outputs of the respective inverters 38, 40, 42 are applied to a NAND gate 50, and also are respectively applied to NAND gates 52, 54 and 56. The output of the NAND gates 52, 54 and 56 are respectively applied to the D inputs of flip flops 58, 60 and 62. These flip flops may be alternatvely designated as INF1, INF2 and INF3. Clock inputs to these flip flops are provided by a clock source 64.

The Q outputs of flip flops 58, 60 and 62 are respectively applied as a second input to AND gates 44, 46 and 48, as well as a first input to AND gates 66, 68 and 70. The Q outputs are also applied as an input to NAND gates 72, 74 and 76.

The $\bar{Q}$ outputs of the flip flops 58, 60 and 62 are all applied as inputs to a NAND gate 78. The outputs of AND gates 44 and 66 are applied to an OR gate 80. The outputs of AND gates 46 and 68 are applied to an OR gate 82. The outputs of AND gates 48 and 70 are applied to an OR gate 84. The outputs of the respective OR gates 80, 82 and 84 are applied to the D inputs of flip flops 86, 88 and 90. The clock inputs to these flip flops is also obtained from the clock source 64. These flip flops may also be designated respectively as IN1, IN2 and IN3.

The Q output of flip flop 86 is applied as a second input to AND gate 66 and as the first input to a NAND gate 94. The Q output of flip flop 88 is applied as a second input to AND gate 68 and as a first input to a NAND gate 96. It is also applied as a first input to a NAND gate 98. The Q output of flip flop 90 is applied as a second input to AND gate 70 and as a first input to a NAND gate 100. The Q outputs of flip flops 86, 88 and 90 constitute the three inputs to a NAND gate 102.

The $\bar{Q}$ output of flip flop 86 constitutes a second input to NAND gate 96. The $\bar{Q}$ output of flip flop 88 constitutes second inputs to NAND gate 94 and to NAND gate 100. The $\bar{Q}$ output of flip flop 90 constitutes a second input to NAND gate 98. The $\bar{Q}$ outputs of these three flip flops also constitute the three inputs to a NAND gate 104.

The outputs of NAND gate 94, 96, 98, and 100 are respectively applied to inverters 106, 108, 110, and 112. The output of the inverter 106 signals an up-down counter (of appropriate bit length) 114 to count up. The output of the inverter 108 signals the counter 114 to count down. The output of the inverter 110 signals an up-down counter (of appropriate bit length) 116 to count up, the output of the inverter 112 signals the up-down counter 116 to count down. Clock pulses are applied to these counters for being counted, from the clock pulse source 64.

The output of NAND gate 78 constitutes one input to a NAND gate 118. The second input to that NAND gate is received from an inverter 120 driven by NAND gate 104. The output of NAND gate 118, when present, serves to clear both counters 114 and 116.

The output of NAND gate 102 is applied to a NAND gate 122. The output of this NAND gate and of NAND gate 118 are applied to a NAND gate 124. The output of NAND gate 124 is applied as the D input to a flip flop 126, otherwise designated as STB. The clock input to this flip flop is derived from clock pulse source 64.

The Q output of flip flop 126 constitutes the second input to NAND gate 122.

As will be described subsequently herein, the contents of the two counters 114 and 116 are transferred to two data registers, respectively 132 and 134, when the gates, represented by gates 136, 138, 140, and 142 between the respective up-down counters and the data registers are enabled. One enabling input constitutes the output of NAND gate 102 applied through inverter 128. The other enabling input constitutes the Q output of flip flop 126. These data registers, 132 and 134, are enabled by the clock pulse source 64. In addition to enabling the transfer of the counts in the manner described, the output of NAND gate 128 and the Q output of flip flop 126 are applied to a NAND gate 144. The output of the NAND gate is applied to a one shot circuit 146, through an inverter 148. The output of the one shot circuit constitutes one input to a NAND gate 150. A second input to that NAND gate is a Q output of a flip flop circuit 152, also designated as FLT. The clock input to the flip flop is derived from the clock pulse source 64.

The Q output of flip flop 152 constitutes a second input to NAND gates 72, 74, 76, and also is applied to a NAND gate 154. The outputs of NAND gates 72, 74 and 76 serve as the second inputs respectively, to NAND gates 52, 54 and 56. The output of NAND gate 104 is applied through an inverter 156, to a NAND gate 158. The output of NAND gate 50 is the second input to NAND gate 154. The outputs from NAND gates 150 and 154 constitute the other required inputs to NAND gate 158. NAND gate 158 output constitutes a D input to flip flop 152.

It should be noted that all of the flip flops which are used herein are of the type that when their D inputs are low (i.e., voltage less than .7 volts), the next clock pulse will reset these flip flops.

In order to explain the operation of the circuit shown in FIG. 3, reference will be had also to the timing diagram shown in FIG. 5. By way of example, let it be assumed that the screen is tapped at a location such that the time $T_1$ is shorter than $T_2$, and $T_2$ is shorter than $T_3$. This is represented in FIG. 5 by the wave forms designated by $T_1$, $T_2$ and $T_3$. Clock pulses are represented by vertical lines. Upon the arrival of the first clock pulse after the $T_1$ signal is received by transducer 12, flip flop 58 is set. Upon the occurrence of the next clock pulse, flip flop 86 is set. It will be seen that as soon as the next clock pulse, occurring after the flip flop INF1 is set, flip flop IN1, or 86 is set. Similarly, the first clock pulse occurring after receiving $T_2$ sets flip flop 60. Flip flop 88 is set on the next clock pulse. Similarly, $T_3$, followed by a clock pulse, sets flip flop 62. The next clock pulse sets flip flop 90.

When flip flop INF1 is set, NAND gate 78 is enabled to apply an output to NAND gate 118. In response, the output of NAND gate 118 provides a clear signal to the six bit counters, respectively 114 and 116. The output of NAND gate 118 also serves to enable flip flop 126 to be set. This may be seen from the waveform diagram. This flip flop 126 is locked to its on state through NAND gates 122 and 124.

From the waveform diagram in FIG. 5, it will be seen that the next clock pulse after flip flop 58, or INF1 is set, flip flop IN1 or 86 is set. When flip flop IN1 is set, its $\bar{Q}$ output goes high whereby NAND gate 118 output is terminated, thus terminating the clear pulse signal to the counters. However, the flip flop 126 remains held on by virtue of the loop from its Q output through NAND gate 122 to NAND gate 124 to its D input.

When the IN1 flip flop 86 goes on before the IN2 flip flop 88 goes on, which is the situation being discussed here, then the counter 114 is enabled to count up its clock pulses. This is accomplished by means of the up count enabling signal received through the NAND gates 94 and 96. The Q output of flip flop 86 enables NAND gate 94 and the removal of the $\bar{Q}$ output disenables NAND gate 96. The Q output of flip flop 88 can enable NAND gate 98 while simultaneously disenabling NAND gate 94. Therefore, if flip flop 86 came on after flip flop 88, the counter would be placed in its down count mode. Similarly, if flip flop 88 comes on before flip flop 90, as is the case here, then counter 116 will count up. If the reverse were true, then counter 116 would count down. This is accomplished by the NAND gates 98 and 100. When flip flop 88 goes on, its Q output enables NAND gate 98, while with its $\bar{Q}$ output being high, NAND gate 100 is not able to energize the down count terminal of the counter 116. Since the situation presently being discussed is one in which flip flops 86, 88 and 90 go on in that order, the counters 114 and 116 will both be enabled to count up.

As previously indicated, when flip flop IN1, or 86, goes on, the clear pulse is terminated and counter 114 is enabled to commence counting clock pulses. Counter 116 cannot commence to count clock pulses until it is enabled to count up. This occurs at the time that flip flop IN2 goes on. This may be seen from the waveform diagram.

Flip flop 152 is used to prevent the effects of noise interfering with the operation of the inputs to the flip flops 58, 60 and 62. It will be recalled that NAND gate 104 provides an output when any one of the flip flops 86, 88 or 90 is turned on. This output serves to both terminate the clear pulse for the counters and also turns on flip flop FLT, 152. The Q output of the flip flop 152 holds it on until one of the input signals received from the line transducers, as indicated by output from NAND gate 50, is terminated. This would terminate the hold signal through NAND gate 154 which is required to maintain the flip flop in its high state. As long as flip flop 152 is maintained on, it applies its Q output to NAND gates 72, 74 and 76 to maintain them in a state whereby their outputs assist in maintaining flip flops 58, 60 and 62 in their on states.

The situation thus far described is that the counters 114 and 116 are enabled to count up clock pulses when they are turned on, which occurs when flip flops 86 and 88 are turned on successively. Flip flop FLT, 152, maintains the INF1, INF2 and INF3 flip flops, respectively 58, 60 and 62, in their high states. AND gates 66, 68 and 70, and the feedbacks from the Q outputs of the respective flip flops 86, 88 and 90, serves to maintain these flip flops in their on states. IN1, IN2 and IN3 will stay on as long as flip flops INF1, INF2 and INF3 are maintained on.

Now, when flip flop IN2 comes on, not only does its Q output enable counter 116 to start to count up, but when its $\bar{Q}$ output is removed, the NAND gate 94 is turned off, thus terminating the count of counter 114. Similarly, when the flip flop 90 or IN3 is turned on, its $\bar{Q}$ output is removed whereby the output of NAND gate 98 is no longer available, thus, counter 116 has its count terminated. As a result, counter 114 has a count representative of $T_1 - T_2$. This is the difference in arrival times between $T_1$ and $T_2$. Counter 116 has a count representative of $T_2 - T_3$. This is the difference in arrival times between $T_2$ and $T_3$.

It is necessary now to transfer these counts into the respective data registers 132 and 134. This occurs in response to an enabling signal being applied to the NAND gates 136, 138, 140, and 142. A first enabling signal is provided by the output of flip flop STB, 126, and the second enabling signal occurs when NAND gate 102, in response to the presence of the three Q outputs of flip flops 86, 88 and 90, applies its output, through inverter 128, to the NAND gates 136 through 142. Thereby, the count in the counters is transferred into the respective data registers.

At this time also, NAND gate 144 is enabled to apply an output to one shot 146. The one shot output is provided to insure that the flip flop FLT, 152, will be maintained on, which in turn maintains the flip flops INF1, 58, INF2, 60, and INF3, 62, on. This is done to insure that the system does not respond to another tap until the response to the tap which has occurred is cleared through. The duration of the output of the one shot 146 is determined by whatever additional time is required to insure that the response to the inputs to the system has completely taken place. The first clock pulse that occurs after the termination of the one shot output resets the FLT, 152, flip flop if all outputs from 30, 32 and 34 are low. On the clock pulse following that one, flip flops INF1, INF2 and INF3, respectively 58, 60 and 62, are reset. On the clock pulse following that one, flip flops IN1, IN2 and IN3, respectively 86, 88 and 90, are reset. The system is now ready for accepting new inputs. From the foregoing description, it should be clear how the circuit described will operate in response to other variations in arrival times $T_1$, $T_2$ and $T_3$ and thus produce the required quantities $T_1 - T_2$, or $\Delta T_{12}$ and $T_2$ $-T_3$, or $\Delta T_{23}$. For all digital operations, the quantities $\Delta T_{12}$ and $\Delta T_{23}$ may be directly transmitted to additional digital computing circuitry to derive the coordinates of the tapped point $X_0$, $Y_0$. The computation may also be completed in analog form as described below.

Figure 4:
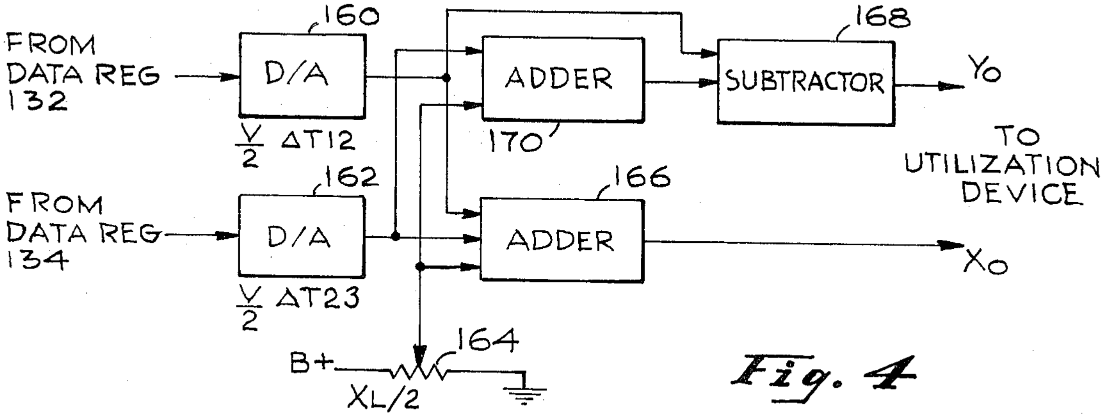

Referring now to FIG. 4, the respective outputs from the data registers 132 and 134 are applied to the respective digital to analog converters 160 and 162. Now referring to equations four and five in the specification, since the values of $\Delta T_{23}$ and $\Delta T_{12}$ are the quantities which have been converted from a digital to an analog form by the respective D to A converters, 160 and 162, and since the velocity through the screen is a known quantity and is a constant for the particular material used for the screen 10, the respective digital to analog converters, 160 and 162, may be given a gain such that the output of the respective digital to analog converters represents the product $V/2 \times \Delta T_{12}$, and $V/2 \times \Delta T_{23}$. The quantity $X_L$ is known, being the length of one side of the screen. A voltage representative of $X_L/2$ can be derived from a potentiometer 164 which is connected across a source of potential, here represented by B+ and ground.

All the quantities required for solving equations four and five are not present. The output of the D to A converter 160, which comprises $V/2\ \Delta T_{12}$ is applied to an adder 166 and also to a subtractor 168. The adder 166 also has applied thereto the output of the D to A converter 162, which is $V/2\ \Delta T_{23}$, and also the quantity $X_L/2$, derived from the potentiometer 164. Therefore, the output of the adder 166 will be the quantity $X_0$. An adder 170 has applied thereto the output of the D to A converter 162 as well as the quantity $X_L/2$. The output of the D to A converter 160 is also applied to the subtractor 168 to be subtracted from the output of the adder 170 which is applied thereto. The result is that the output of the subtractor 168 is the quantity $Y_0$. $X_0$ and $Y_0$, which are the coordinates of the locus of the point which has been tapped on the screen, can then be applied to a utilization device.

There has therefore been described and shown above a novel and useful system for generating electrical signals representative of the coordinates of a point which has been tapped on a screen.

What is claimed is:

1. A system for generating signals, respectively $X_0$, $Y_0$, which are representative of the locus of a point from which sound originates on a rectangular screen, relative to an origin point, comprising first, second and third transducer means, positioned along first, second and third sides of said screen for generating first, second and third signals in response to the sound from said sound originating locus being received by said respective first, second and third transducer means through the material of said screen, means responsive to the difference between the time of generating said first and second signals to generate a fourth signal representative thereof, means responsive to the difference in the time of generating said second and third signals to generate a fifth signal representative thereof, means for generating a quantity representative of the velocity of sound through said screen divided by two, means for multiplying said fourth signal by said quantity representative of the velocity of sound through said screen divided by two to produce a sixth signal representative thereof, means for multiplying said fifth signal by said quantity representative of the velocity of sound through said screen divided by two to produce a seventh signal representative thereof, means for generating an eighth signal representative of the length of one side of said screen divided by two, means for adding said sixth, seventh and eighth signals to produce a resultant signal equal to $X_0$, means for subtracting said sixth signal from said seventh signal to produce a resultant signal, and means for adding said eighth signal to said last named resultant signal to produce a signal representative of $Y_0$.

2. A system as recited in claim 1 wherein said means to generate a fourth signal and said means to generate a fifth signal comprise a first and a second up-down counter, a source of clock pulses, means for applying clock pulses from said source to said first and second counters to be counted when said counters are enabled to count, means responsive to said first signal being generated before said second signal is generated to enable said first counter to count up, means responsive to said second signal being generated before said first signal is generated to enable said first counter to count down, means responsive to said second signal being generated before said third signal is generated to enable said second counter to count up, means responsive to said third signal being generated before said second signal to enable said second counter to count down, means responsive to the enabling of said second counter to commence counting to terminate the count of said first counter, whereby the count in said first counter is a digital representation of said fourth signal, and means responsive to the generation of said third signal to terminate the count of said second counter, whereby the count of said second counter is a digital representation of said fifth signal.

3. A system as recited in claim 2 wherein said means responsive to said first signal being generated before said second signal is generated to enable said first counter to count up, means responsive to said second signal being generated before said first signal is generated to enable said first counter to count down, means responsive to said second signal being generated before said first signal is generated to enable said second counter to count up, means responsive to said third signal being generated before said second signal to enable said second counter to count down, includes a first, second and third flip flop, each having set and reset outputs, first gate means responsive to the set output of said first flip flop and the reset output of said second flip flop to enable said first counter to count up, second gate means responsive to the reset output of said first flip flop and the set output of said second flip flop to enable said first counter to count down, third gate means responsive to the set output of said second flip flop the reset output of said third flip flop to enable said second counter to count up, fourth gate means responsive to the reset output of said second flip flop and the set output of said third flip flop to enable said second counter to count down, means to apply said first signal to said first flip flop to cause it to produce a set output, means to apply said second signal to said second flip flop to cause it to produce a set output, and means to apply said third signal to said third flip flop to cause it to produce a set output.

4. A system as recited in claim 3 wherein there is included means responsive to the first occurrence of a set output from any one of said first, second and third flip flops to generate a clear signal which clears the counts from said first and second counters.

5. A system as recited in claim 3 wherein there is included means for maintaining said first, second and third flip flop means unresponsive to any additional first, second and third signals over a predetermined interval.

6. A method for generating signals, respectively $X_0$, $Y_0$, which are representative of the locus of a point from which sound originates on a rectangular screen, relative to an origin point, comprising generating a first signal representative of the difference in the time of arrival of sound through said screen from said sound originating point at a first and second side of said screen, generating a second signal representative of the difference in the time of arrival of sound through said screen from said sound originating point at said second and a third side of said screen, generating a third signal representative of the velocity of sound through said screen divided by two, multiplying said first signal by said third signal to produce a fourth signal, multiplying said second signal by said third signal to produce a fifth signal, generating a sixth signal representative of the length of one side of said screen divided by two, adding said fourth, fifth and sixth signals to produce a signal representative of $X_0$, subtracting said fourth from said fifth signal to produce a seventh signal, and adding said sixth and seventh signals to produce a signal representative of $Y_0$.

7. A method for generating signals, respectively, $X_0$, $Y_0$, which are representative of the locus of a point from which sound originates in a rectangular screen, relative to an origin point, as recited in claim 6 wherein said step of generating a first signal includes generating a first side signal in response to the arrival of sound at said first side through said screen from said sound originating point, generating a second side signal in response to the arrival of sound at said second side through said screen from said sound originating point, generating a third side signal in response to the arrival of sound at said third side through said screen from said sound originating point, measuring the interval between the generation of said first side and second side signals and producing a first signal representative thereof, and measuring the interval between the generation of said second side and third side signals and producing a second signal representative thereof.

* * * * *